(12) United States Patent
Esterling (10) Patent No.: US 7,536,237 B2
(45) Date of Patent: *May 19, 2009

(54) SENSOR-BASED MEASUREMENT OF TOOL FORCES AND MACHINING PROCESS MODEL PARAMETERS

(75) Inventor: Donald M. Esterling, 201 Stable Rd., Carrboro, NC (US) 27510-4144

(73) Assignee: Donald M. Esterling, Carrboro, NC (US)

( * ) Notice: Subject to any disclaimer, the term of this patent is extended or adjusted under 35 U.S.C. 154(b) by 296 days.

This patent is subject to a terminal disclaimer.

(21) Appl. No.: 11/484,314

(22) Filed: Jul. 12, 2006

(65) Prior Publication Data

US 2007/0016325 A1 Jan. 18, 2007

Related U.S. Application Data

(60) Provisional application No. 60/698,998, filed on Jul. 12, 2005.

(51) Int. Cl.
*G06F 19/00* (2006.01)
(52) U.S. Cl. .................... 700/175; 700/31; 700/170; 700/173; 700/174; 700/179; 702/41
(58) Field of Classification Search .............. 700/28, 700/29, 30, 31, 32, 37, 47, 48, 67, 159, 160, 700/165, 169, 170, 173, 174, 175, 179; 702/41
See application file for complete search history.

(56) References Cited

U.S. PATENT DOCUMENTS

| 5,666,710 A | * | 9/1997 | Weber et al. ........... 29/243.523 |
| 6,505,494 B1 | * | 1/2003 | Wollermann ................ 73/1.15 |
| 6,731,995 B2 | * | 5/2004 | Takeuchi .................... 700/96 |
| 7,206,657 B2 | | 4/2007 | Esterling |

* cited by examiner

*Primary Examiner*—Sean P Shechtman (57) ABSTRACT

A system and method are provided for real-time measurement of tool forces. A relationship between a sensor characteristic and tool forces is determined by directly measuring tool forces for a standard tool, work piece, and part program. The sensor characteristic for a CNC machine at the user facility is then measured for the standard tool, work piece, and part program, providing a relationship between the sensor characteristic at the user facility and tool forces. If the sensor is not conveniently attached to the work piece or the part program is not sufficiently robust in cutting conditions, the work piece and part program are replaced by a sacrificial work piece and sacrificial part program. The sacrificial work piece and sacrificial part program are selected to accommodate the sensors and to provide sufficient robustness in cutting conditions to accurately determine the process model parameters for the sacrificial work piece.

24 Claims, 6 Drawing Sheets

SENSOR-BASED MEASUREMENT OF TOOL FORCES AND MACHINING PROCESS MODEL PARAMETERS

RELATED APPLICATIONS

The present application present application claims priority from provisional U.S. Patent Application Ser. No. 60/698,998, entitled DEVICE FOR THE MEASUREMENT OF MILLING CUTTING TOOL FORCES AND MACHINING PROCESS MODEL PARAMETERS, filed Jul. 12, 2005, which is hereby incorporated herein by reference in its entirety.

FIELD OF THE INVENTION

The present invention relates to Computer Numerical Control (CNC) machining, and more particularly relates to a method for real-time measurement of tool forces and machining process model parameters.

BACKGROUND OF THE INVENTION

Tool forces Tool forces depend on the particular tool, cutting geometry, stock (workpiece) and other cutting conditions including whether or not coolant is used. Current methods for measuring tool forces require the use of a complex and expensive dedicated device such as a piezoelectric force sensor. Due to the complexity and expense of the force sensor, these methods of tool force measurement are most typically used in academic and laboratory studies.

In lieu of direct measurements, tool forces may be predicted for specified cutting conditions using a suitable process model and process model parameters, such as cutting energies. However, the prediction of tool forces using cutting energies does not eliminate the need for tool force measurements. The process model parameters are obtained by measuring tool forces under controlled circumstances requiring the use of a complex and expensive dedicated device such as a piezoelectric force sensor and then performing a best fit of these process model parameters to a tool force model.

This method provides the tool forces under a variety of cutting geometries, but is limited to the particular combination of tool, stock, and other conditions used to determine the process model parameters. The predictions are only useful if they may be extended to cutting conditions beyond those used to determine the cutting energy. However, this extension is prone to substantial errors.

The cutting energies may deviate from their nominal values for a variety of reasons. A common tool type involves placing an insert into a solid tool body, with the insert forming the cutting edge. While the tool used to determine the cutting energy may be nominally the same as that used in practice, minor variations in this insertion process can change the angle of the cutting edge. This changes the effectiveness of the particular tool, its cutting properties and the resulting cutting energy. Another type of deviation results from the variation of the nominal properties of part materials from job to job. A particularly severe and important example of this occurs when the initial stock is a casting, where, due to the casting process, the as-cast material properties can be quite diverse.

Some tabular data of cutting energies is available for a wide range of tool and part material combinations. As with any laboratory measurements, there can be substantial deviations in the actual cutting energies from these tabulated values even for nominally the same tabulated tool and material.

The variation in the cutting energies makes their application to tool force prediction problematic at best. Further difficulties arise when the cutting energies found in one laboratory are transferred to other applications. These difficulties are not usually discussed in the research literature, since such concerns are often counter to the interests of the researcher.

In addition, the cutting energies in the tables and in the research literature are determined for an ideal (sharp) tool. As the tool wears, the model parameters can change by as much as a factor of two or three, so precision in determining the initial model parameters may not be helpful as the machining process continues.

Thus, cutting energies can only be reliably applied to tool force prediction when the cutting energies are measured for the particular tool, part and cutting process under consideration. Applications of the cutting energy values to other conditions may serve as a general guideline to expected values, but are not expected to be sufficiently accurate for applications such as tool condition monitoring and (Numerical Control) NC optimization.

However, in order to measure the cutting energies for a particular tool, part and cutting condition under consideration, tool forces must be determined. Since tool forces are traditionally determined using expensive and complex dedicated equipment to directly measure tool forces, obtaining cutting energies for tool force prediction for each individual job has not been an option. Thus, there remains a need for an inexpensive method for real-time measurement of tool forces and process model parameters.

In milling applications, there are six process model parameters to be determined. They correspond to a volumetric and an edge effect contribution to the cutting force and each of these, in turn, may be divided into cutting energies associated with the axial, tangential and the radial components of the cutting force. Of these process model parameters, the axial cutting energies can be of less importance in applications since the tool is stiff along its axis, leading to minimal tool deflections in that direction, and axial forces are typically less important than tangential forces in determining the spindle power requirements for a particular job.

In the U.S. patent application Ser. No. 11/031,748 [Esterling, 2005], the entire contents of which are hereby incorporated by reference, a system is described which combines information from inexpensive sensors such as motor power sensors with a virtual model of the CNC cutting process to obtain tool cutting forces and machining process model parameters.

The invention in [Esterling, 2005] relies on accurate measurements of spindle and feed drive power or feed drive currents and provides a method to relate these measurements to tangential and radial cutting forces. Normally, the calibration that provides the relationship of spindle power or feed drive current to tool forces would require the use of a complex and expensive dynamometer at the application site. [Esterling, 2005] describes a method whereby the application site only is required to take some simple tool cuts with a standardized tool and stock material to determine this calibration factor. Once the tool forces are determined from the indirect measurements of spindle and/or feed drive power and/or current, the machining process model parameters may be determined in situ, as the application part program is run.

There are two difficulties with [Esterling, 2005]. First, the feed drive power or current measurement may be too noisy for accurate use. The feed drive power is rapidly varying due to a number of factors including bearing friction, backlash and inertial mass of the CNC system and workpiece. If the feed drive or power is not accurately known, then the spindle power alone will only provide the tangential cutting force. The radial cutting energy and, from these, the radial component of the cutting force is important as it is mainly responsible for tool deflection perpendicular to the tool axis which impacts on part surface quality and tolerance. While the radial cutting energy is often considered to be a constant ratio to the tangential cutting energy (most often, this ratio is taken as ⅓), this may not always be the case and other ratios may apply.

Second, under the method described in [Esterling, 2005], the user's particular application part program may not have sufficient variation in key process conditions (specifically the material removal rate and the contact area) over the initial cutting process and this may cause inaccuracies in a least squares fitting procedure for the process model parameters.

SUMMARY OF THE INVENTION

This invention will provide an alternative method for obtaining tool cutting forces and machining process model parameters that will supplement the information obtained via the method of [Esterling, 2005] and/or provide an alternative measurement system when the latter method is insufficient.

The invention will modify the method of [Esterling, 2005]. Before cutting the application part, the system may cut a "sacrificial block." This sacrificial block will have simple sensors attached, such as 1D load cells, a microphone or an accelerometer, that will provide inexpensive but accurate monitoring of the tool forces that supplement the tangential force information extracted from measuring the spindle power. This additional force information can be used in lieu of measuring feed drive power or feed drive current.

The part program for the sacrificial block will have a sufficient diversity in the material removal rate and the contact area for an accurate fit for the machining process model parameters applicable for the particular cutting tool and sacrificial block material. The use of a part program specific for the sacrificial block ensures that there is sufficient diversity in the cutting conditions for reliable measurement of the cutting energies, while only requiring relatively simple test cuts on the sacrificial block.

The cutting energies obtained while using the sacrificial block may be scaled to the situation where the same tool is cutting the application material by the simple procedure of monitoring the spindle power when cutting each material, the scaling in the cutting energies for the tool from the sacrificial work piece to the application work piece is obtained as detailed in the Detailed Embodiment section.

BRIEF DESCRIPTION OF THE DRAWING FIGURES

The accompanying drawing figures incorporated in and forming part of this specification illustrate several aspects of the invention and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system for measuring tool forces and process model parameters in real-time without the use of force sensors that directly sense tool forces. The force sensors are expensive and, due to their compliance, make the Computer Numerical Control (CNC) machine less stiff and degrade its performance. Indirect sensors, such as power sensors, are inexpensive and non-invasive. However, the difficulty is in calibrating the sensor data, such as spindle or feed drive power, with regard to tool force. Thus, the present invention provides a means for calibrating the sensor data with respect to tool forces. As a result, sensor data may be measured in real-time and used to provide real-time measurements of tool forces and process model parameters.

Figure 1:
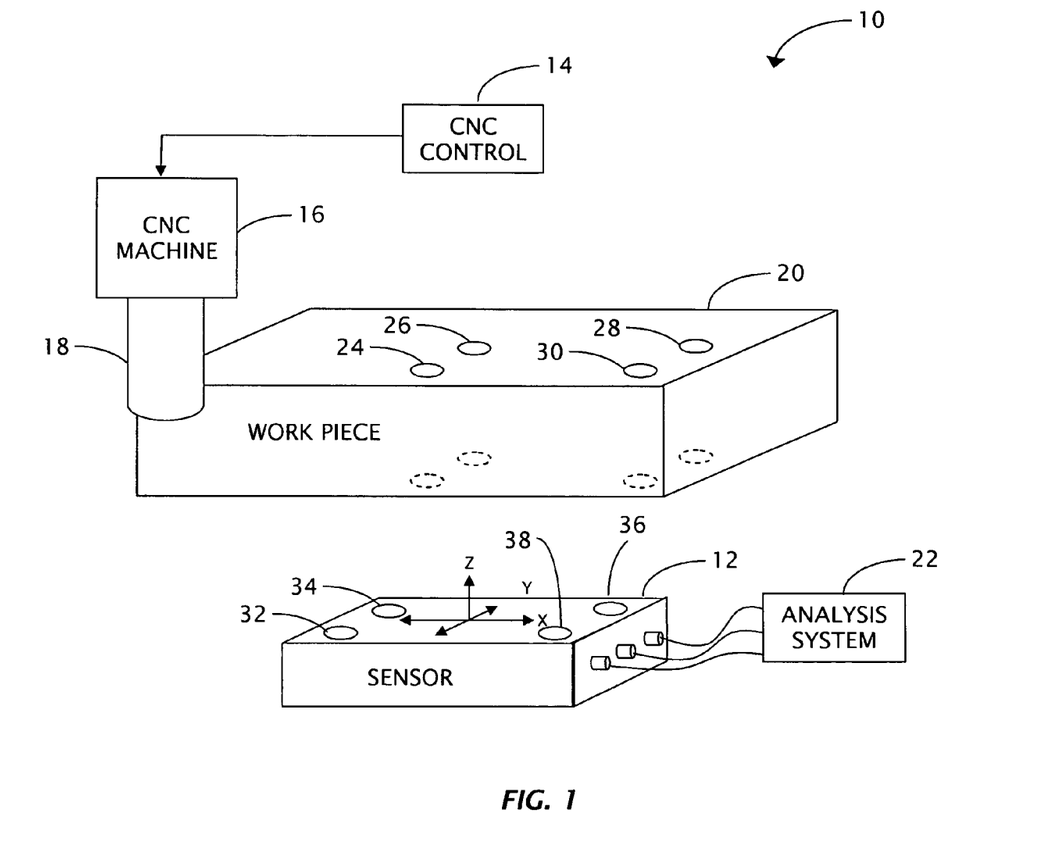
FIG. 1 illustrates an exemplary system for directly measuring tool forces using force sensors in a central facility according to one embodiment of the present invention.

FIG. 1, similar to FIG. 1 of [Esterling, 2005], illustrates a system 10 for directly measuring tool forces using a force sensor 12. The force sensor can measure all three directional components of the tool forces. In general, the system 10 includes the force sensor 12, a Computer Numerical Control (CNC) control system 14, a CNC machine 16, a tool 18, a work piece 20, and an analysis system 22. As discussed below, the tool 18 and work piece 20 are provided to an end user to calibrate a CNC machine (FIGS. 2A and 2B) of the end user. Thus, the tool 18 and work piece 20 that are provided to the end user from system 10 are referred to as a "standard" tool and work piece.

In operation, the CNC control system 14 controls the operation of the CNC machine 16 using a series of commands defined by a part program. More specifically, based on the part program, the CNC control system 14 commands motors within the CNC machine 16 to drive and guide the tool 18 as the tool 18 cuts the work piece 20.

The work piece 20 is coupled to the force sensor 12 for example using bolt holes 24-30 with bolts that screw into mating holes 32-38 in the force sensor 12. The force sensor 12 is a multi-axis force sensor that simultaneously measures force components in the X, Y, and Z directions. In one embodiment, the force sensor 12 is a piezoelectric device that converts the sensed force on the force sensor 12 to an electrical force signal. As the tool 18 induces forces in the work piece 20, the forces in the work piece 20 induce forces on the force sensor 12. The output of the force sensor 12 is provided to the analysis system 22, where it is amplified, recorded, and analyzed to provide a force profile and process model parameters.

According to the present invention, a standard part program is provided to the CNC control system 14 for a set of relatively simple cuts on the standard work piece 20. While the standard part program may be relatively simple, it is sufficiently robust to provide the tool force data necessary to compute the process model parameters. The process model parameters are the parameters of a process model that predicts the physical result of a cutting event. More specifically, the process model is a set of mathematical equations that predicts the system behavior based a geometric model of the cutting event and the process model parameters. The predictions may include tool forces and torques based on motor characteristics such as CNC spindle and feed drive motor power, current, or torque, as well as audio, acoustic, ultrasonic and vibration signals. The geometric model is a solid model representation of the in-process (as-cut) part as well as the geometry of the material removed from the part in any given tool move.

While performing the cutting process for the standard part program, the force sensor 12 measures all three directional components of the tool forces. The output of the force sensor 12 is provided to the analysis system 22. Using the sensed forces, a geometric model (also referred to as a virtual CNC) for the part program, and a process model, the analysis system 22 generates a force profile for the standard part program and calculates the process model parameters. As described below in detail, the process model parameters for the preferred process model are cutting energies. More specifically, the force sensor 12 directly measures the tool forces, and the analysis system 22 performs a best fit process to determine the process model parameters or cutting energies that relate the geometric model of the cutting process to the tool forces.

Figure 2A:
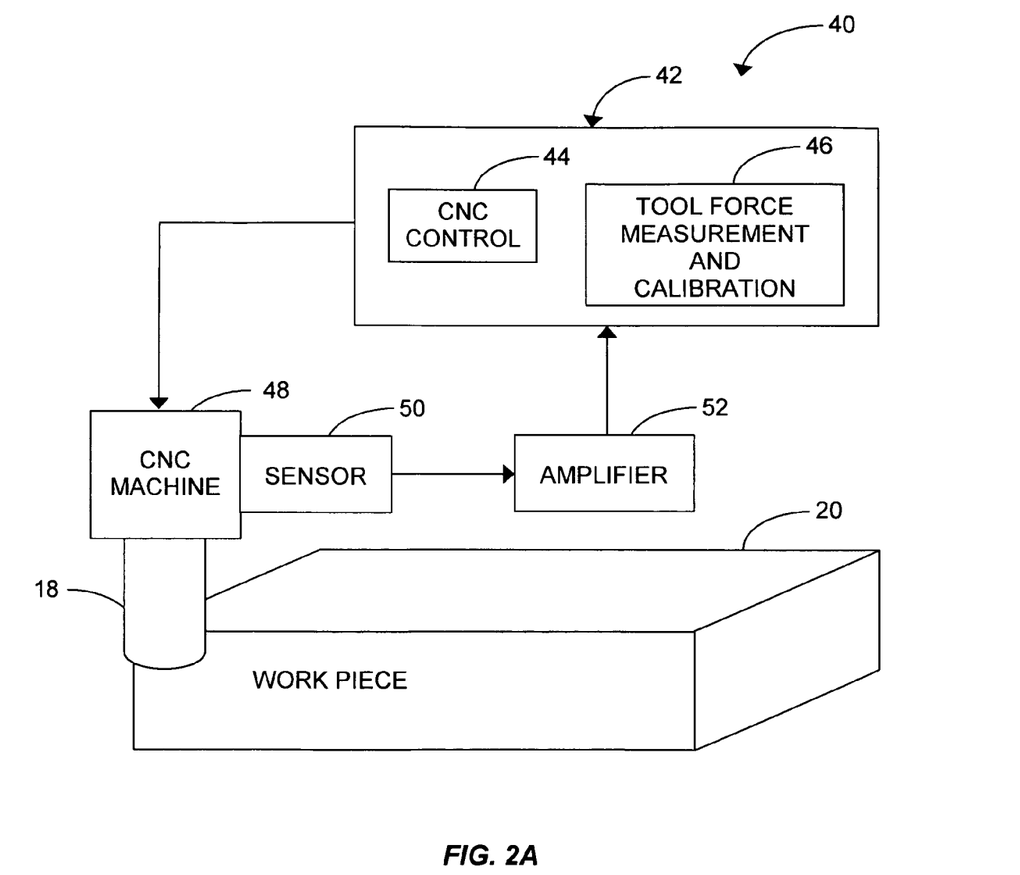
FIGS. 2A-2B illustrate exemplary embodiments of a system for real-time measurement of tool forces and process model parameters using sensors according to one embodiment of the present invention.
Figure 2B:
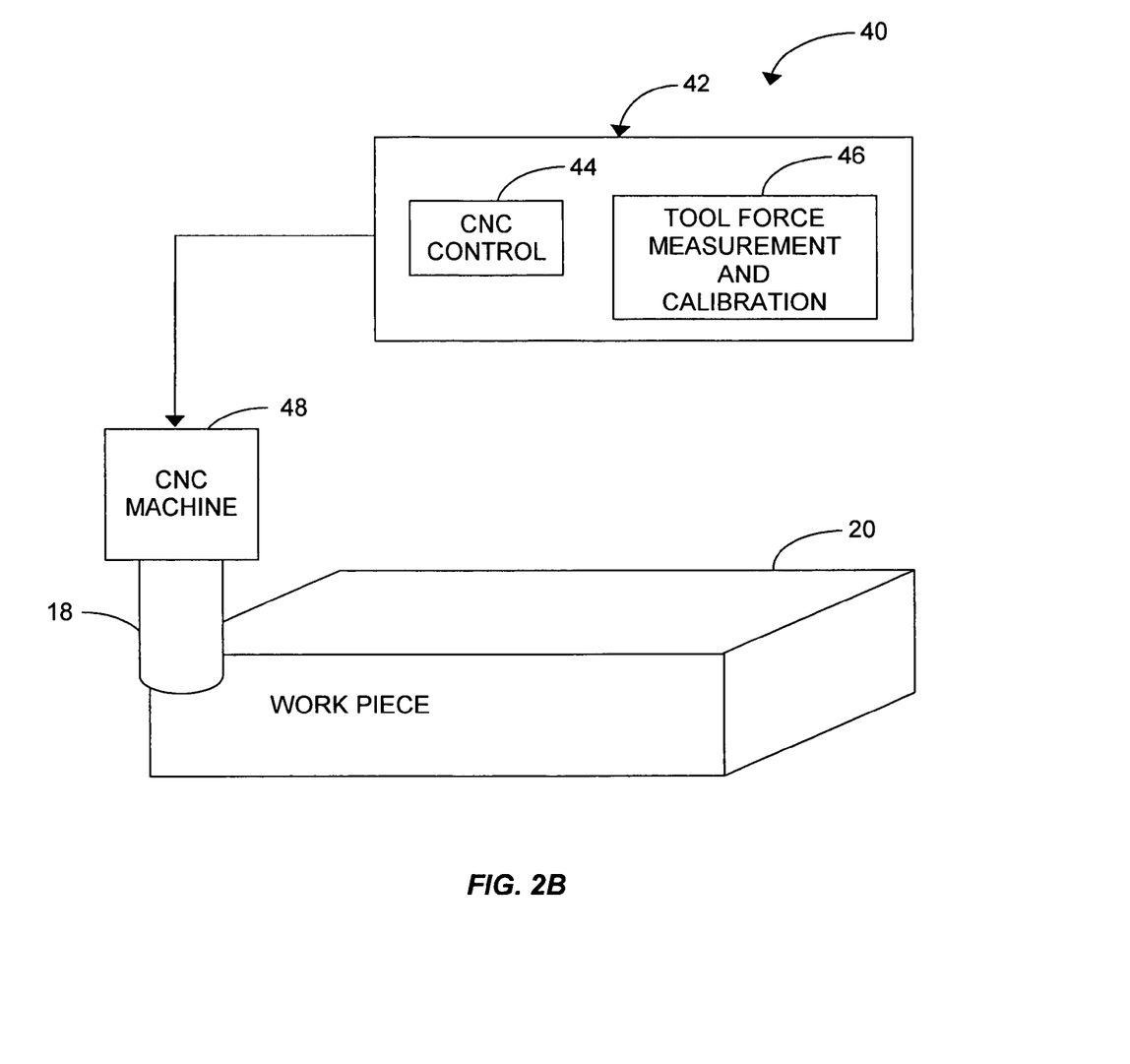

Thereafter, the standard tool 18, work piece 20, and part program are provided to an end user at a user facility. In one embodiment, the standard tool 18 and work piece 20 are provided to the end user along with a computer readable medium containing the standard part program, the force profile, and software for calibrating the user's CNC machine (FIGS. 2A and 2B). It should be noted that the end user does not require direct access to the force profile.

Referring to FIG. 2A, also similar to FIG. 2A in [Esterling, 2005], the user facility includes a system 40 for real-time measurement of tool forces and process model parameters according to one embodiment of the present invention.

In contrast to [Esterling, 2005], the sensor 50 may be sited in or on the CNC machine, on the work piece 20, or multiple sensors may be located in both such locations. The sensor 50 when sited in or on the CNC machine will normally provide the spindle power information which, in turn, provides the tangential component of the tool forces (forces which are at any instant, tangential to the tool as it engages the part). Sensor(s) 50 sited on the work piece 20 will provide measurement of non-tangential components of the tool forces, which would include radial forces (forces acting perpendicular to the tool axis and perpendicular to the tangential direction) and axial forces (forces acting parallel to the tool axis). The sensors 50 may measure spindle or feed drive power, as in [Esterling, 2005] or may include microphones, accelerometers or load cells.

In contrast to [Esterling, 2005], the work piece 20 can either be the standard work piece provided by the central facility or a "sacrificial" work piece also provided by the central facility.

The standard work piece provided by the central facility will be used with the standard part program and standard tool to calibrate the data from the sensor(s) 50 as described herein, relating their output to one or more of the tool force components for the standard tool.

The primary function of the standard tool, work piece and part program will be to calibrate the sensor data at the user's facility with respect to the tool forces.

The sacrificial work piece provided by the central facility will be used with a "sacrificial" part program and the user's tool in conjunction with the data from the sensor(s) 50 as described herein, relating their output to one or more of the tool force components for the user's tool.

The primary functions of the sacrificial work piece and part program will be to provide a convenient method for obtaining process model parameters, free of restrictions inherent in the user's part program, and to provide a convenient method for updating these process model parameters as the user's tool experiences wear.

As described herein, the end user is at a user facility. It should be noted that the user facility where the system 40 is located and the central facility where the system 10 of FIG. 1 is located may be at the same geographic location or at different geographic locations. In either case, the system 10 of FIG. 1 is separate and distinct from the system 40 of FIGS. 2A and 2B. More specifically, the CNC machine 16 (FIG. 1) is separate and distinct from the CNC machine 48.

In one aspect of the present invention, as illustrated in FIG. 2A and as in [Esterling, 2005], the system 40 includes the standard tool 18 and standard work piece 20 from the system 10 (FIG. 1) at the central facility. It should be noted that the system 40 includes the standard tool 18 and standard work piece 20 for calibration. This combination of standard tool, work piece and part program is used to calibrate the data from sensor(s) 50 to relate their output to the tool forces recorded for the standard tool, work piece and part program at the central facility.

The standard part program used to cut the work piece 20 at the central facility, the standard tool 18, and the standard work piece 20 are provided to the user facility, which includes a control system 42. The control system 42 includes a CNC control system 44 and a tool force measurement and calibration system 46. In one embodiment, the control system 42 is a computer, and the CNC control system 44 and the tool force measurement and calibration system 46 are software residing within the control system 42.

In one embodiment, the tool force measurement and calibration system 46 is provided to the end user along with the standard part program and the force profile from the central facility on a computer readable media. The end user then loads the computer readable media into the control system 42 such that the tool force measurement and calibration system 46 including the standard part program and the force profile is installed on the control system 42. Thus, the force profile may be incorporated into the tool force measurement and calibration system 46 so that the end user does not require direct access or understanding of this profile. The end user receives only the standard tool 18, the standard work piece 20, and the computer readable media from the central facility.

Using the standard part program, the control system 42, and specifically the CNC control system 44, instructs the CNC machine 48 at the user facility to perform the same set of cuts using the standard tool 18 and work piece 20 from the central facility. The sensor 50 measures, for example, motor power on the spindle and/or the feed drives of the CNC machine 48 and provides a power signal to an amplifier 52. Unlike the force sensor 12 (FIG. 1), the power sensor 50 is a relatively inexpensive and non-invasive power sensor. Further, the power sensor 50 is relatively easy to install. In one embodiment, the power sensor 50 may be installed by threading power cables providing power to the spindle and/or feed motors through holes in the power sensor 50. The amplifier 52 amplifies the power signal and provides an amplified power signal to the control system 42, and particularly the tool force measurement and calibration system 46.

Alternatively and distinct from [Esterling, 2005], additional sensors 50 such as microphones, accelerometers or load cells may mounted on the standard work piece 20 to calibrate their output relative to the tool forces, especially the non-tangential component of the tool forces, as responding to aspects of the tool forces distinct from the tangential tool forces. This additional sensor information may be combined with spindle power and/or feed drive data, if the latter is sufficiently accurate for such use, to obtain all three components of the tool forces. From this multi-component tool force information, the system can obtain process model parameters associated with all components of the tool forces, not just limited to the tangential components.

Since the standard tool 18 and work piece 20 are the same as used in the central facility, the cutting energy parameters (process model parameters) are also the same. This means that the tool force profile over the standard part program remains the same. The material of the standard work piece 20 is preferably chosen such that there is negligible tool wear between the central facility and the user facility. In one embodiment, the standard work piece 20 is an aluminum standard part to minimize tool wear. The standard tool 18 may be sited in a shrink-fit tool holder to minimize eccentricity effects (runout). The cutting tests, both at the central and at the user facility, should be performed without coolant and lubricants to avoid variations between facilities due to coolant or lubricant type and flow.

Based on the signal from the sensor(s) 50 and the force profile obtained at the central facility, the tool force measurement and calibration system 46 determines a relationship between the sensor output and tool force for the CNC machine 48. The relationship is preferably a transfer function relating sensor output and tool force for the CNC machine 48. More specifically, the sensor data is collected by the sensor 50 over the standard part program. Since the force profile is also known, a match or transfer function is determined that relates the sensor data power to tool forces for the CNC machine 48 at the user facility. In simplest case, the transfer function is a proportionality factor between the sensor data and the tool force components. In practice, some variation in these factors is expected with motor load, spindle speed, feed rate and condition of the motors, which is handled by repeated calibration tests by the end user to determine the dependence of the transfer function on these conditions.

In principle, when sensor 50 is spindle power or feed drive power, only one set of tool cuts is needed to determine the transfer function between motor power and tool force. However, this transfer function may change with the motor characteristics. As such, the process of determining the transfer function should be repeated for cool (startup) and warm motor conditions, and then repeated over time to account for changes, or wear, in motor or belt condition and the like within the CNC machine 48. These latter repetitions may be at infrequent intervals, such as, but not limited to, quarterly.

In a second aspect of the present invention, as also illustrated in FIG. 2A and distinct from [Esterling, 2005], the system 40 includes the user's tool 18 and a sacrificial work piece 20 from the central facility. The sensors 50, now calibrated through a transfer function to relate their output to the tool forces, provide the tool forces for the user's tool as it cuts the sacrificial work piece 20 using a sacrificial part program provided by the central facility. The sacrificial part program, while relatively simple in content, will have sufficient robustness in tool paths and tool forces to effectively relate the tool forces to the process model parameters. In general, this means a relatively wide variation in the material removal rate and the contact area of the tool, as explained later in this Detailed Description.

In [Esterling, 2005], the user's tool was combined with the user's part program, the data from the sensors 50 and the transfer functions to obtain the tool forces for the user's tool. This remains an embodiment of this invention and can be used when the user's part program provides a sufficient variation in the material removal rate and tool contact area to accurately determine the process model parameters. However, this particular embodiment has no control over the contents of the user's part program and this variation can not be ensured in all cases. In contrast, by taking measurements with the user's tool on a sacrificial work piece and using a sacrificial part program specified by the central facility, the needed variation can be ensured.

In sum, whether using the user's work piece and part program or using a sacrificial work piece and part program, tool forces for the desired tool may be measured in real-time by measuring sensor data such as motor power and converting the sensor data into measured tool forces using the transfer function relating sensor data to tool forces for the CNC machine 48. Accordingly, the tool forces are determined in the user facility without the use of expensive and complex instrumentation.

Further, as described below in more detail, the tool forces may then be used to determine the process model parameters, or cutting energies, which may then be used along with geometric models to predict tool forces for any cutting process performed by the CNC machine 48 with the desired tool and work piece. These predictions may be used for applications such as NC optimization and tool condition monitoring.

Referring to FIG. 2B, the illustrated embodiment of the system 40 operates essentially the same as the embodiment of FIG. 2A where tool 18 is the user's tool and work piece 20 is the user's work piece. Thus, for conciseness, the details given above with respect to FIG. 2A will not be repeated. However, in this embodiment, the CNC control system 44 operates according to an open source protocol. Thus, the tool force measurement and calibration system 46 may obtain power data representative of the spindle and/or feed power from the CNC control system 44 directly using a software only solution that reads the power data from the CNC control system 44 with the assistance of an open architecture control. As a result, the cost of the system 40 is further reduced by avoiding the use of the power sensor 50 (FIG. 2A).

The use of a sacrificial work piece does introduce one important layer of complexity relative to the use of the user's work piece. The process model parameters, which can be used in tool condition monitoring or in NC optimization applications, are specific to the user's tool and the sacrificial work piece material. They do not necessarily apply when the user's tool is cutting the user's work piece material. However, a scaling is all that is required to convert the process model parameters from those obtained with the user's tool and the sacrificial part work piece to the user's tool and the user's work piece. The scaling factor is obtained by measuring the spindle power while cutting with the user's tool and work piece as is now detailed.

Spindle power is an accessible and non-invasive source of sensor data whether measured with a separate power sensor as in FIG. 2A or obtained from an open architecture control as in FIG. 2B. Spindle power can be translated into tangential tool forces using the appropriate transfer function as detailed above. The measured tangential tool forces may be obtained directly for the user's tool and user's part program as detailed above. They may be averaged over some portion of the user's part program, leading to an "average measured tangential tool force." No particular variation in the cutting process or the tool forces is required for this average measured tangential tool force.

The process model parameters, based on the values obtained with the sacrificial part program and the user's tools, can be used in the process model to obtain model tangential tool forces and these model forces may be similarly averaged over the same portion of the user's part program to obtain an "averaged model tangential tool force." The ratio of the averaged measured tangential tool force to the averaged model tangential tool force provides a single scale factor for the tangential component of the force as well as the tangential process model parameters. A reasonable assumption is that the non-tangential tool forces and the non-tangential process model parameters scale with the same value. The scale factor provides the required process model parameters for the user's tool, work piece and part program from the values of the process model parameters obtained with the user's tool and the sacrificial work piece and sacrificial part program.

Figure 3:
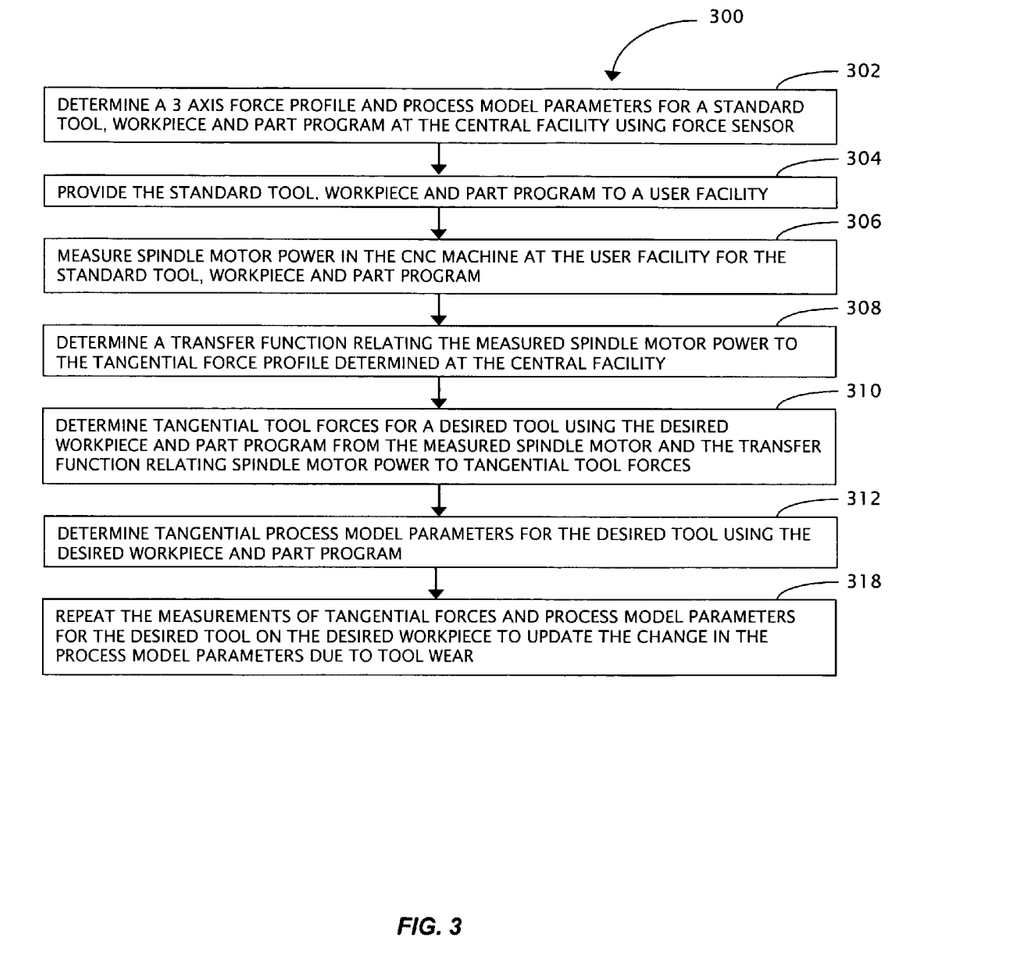
FIG. 3 illustrates a method for real-time measurement of tangential tool forces and process model parameters according to one embodiment of the present invention.
Figure 4:
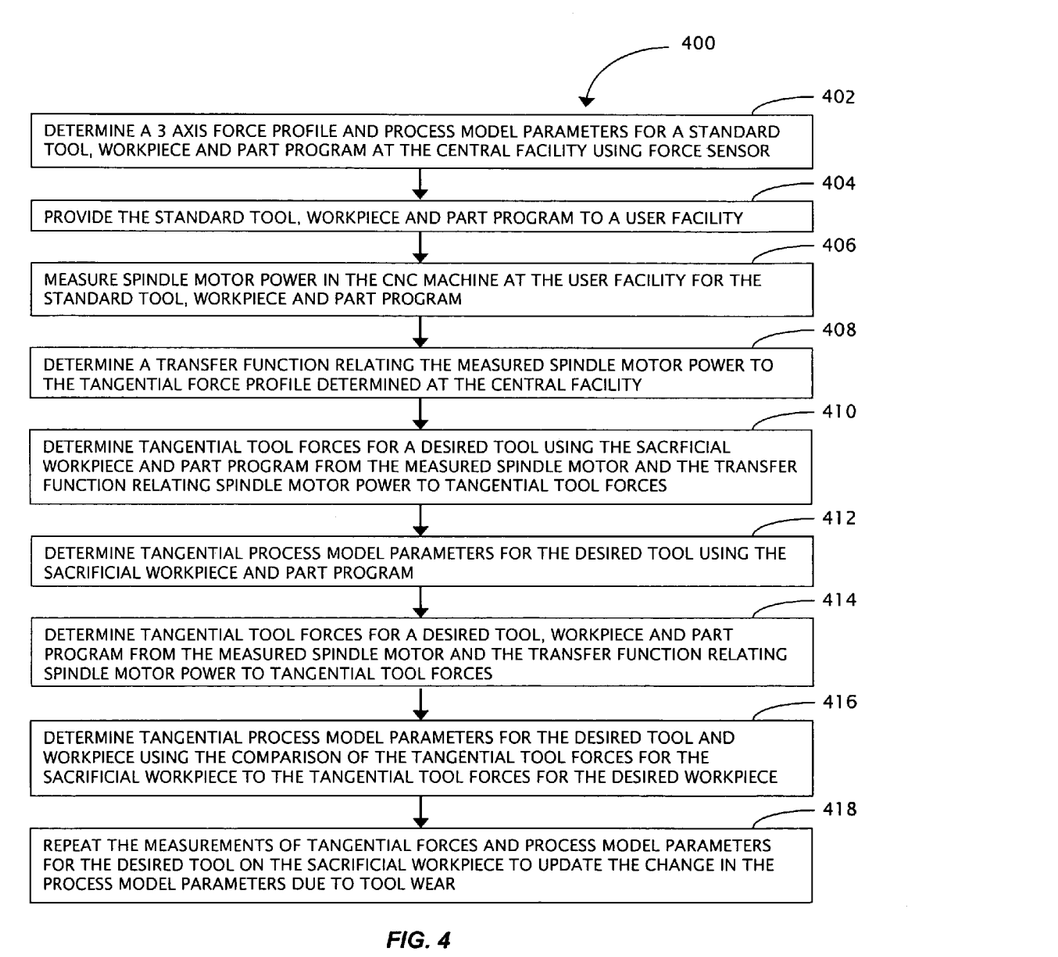
FIG. 4 illustrates a method for real-time measurement of tangential tool forces and process model parameters by machining a sacrificial part program and work piece in addition to machining the user's part program and work piece, according to one embodiment of the present invention.
Figure 5:
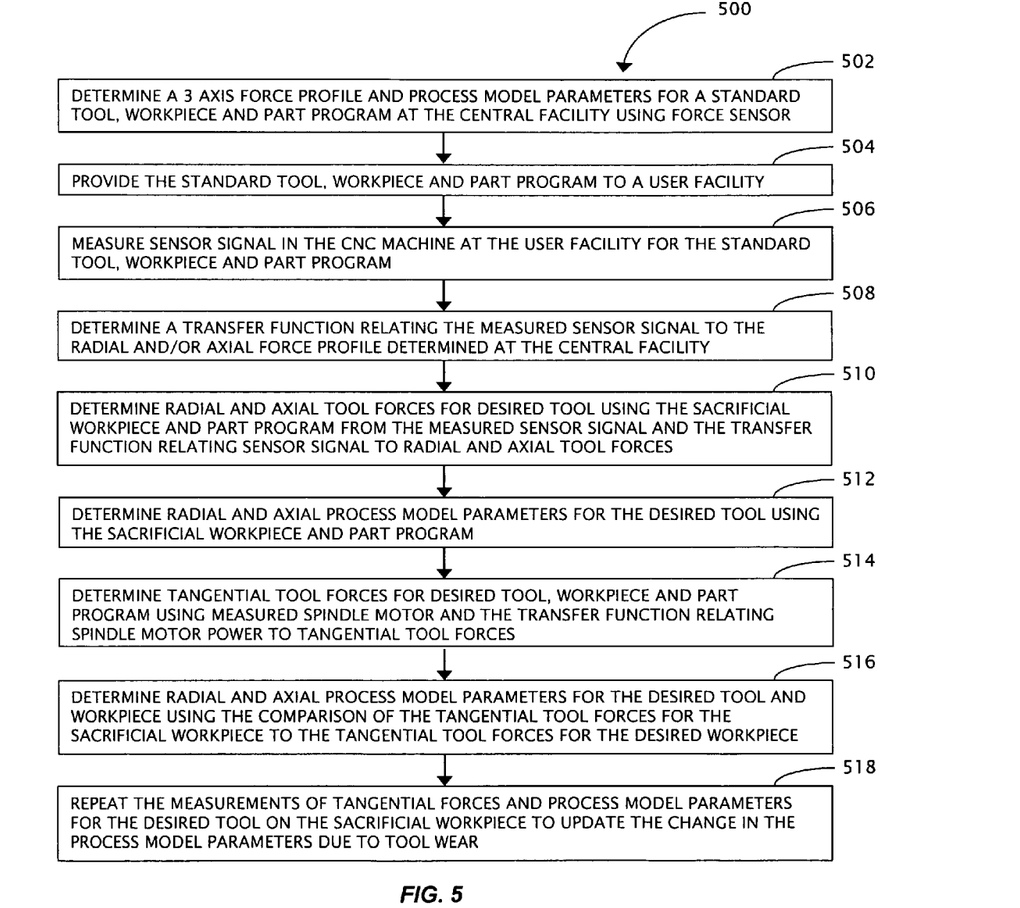
FIG. 5 illustrates a method for real-time measurement of tangential and non-tangential tool forces and process model parameters by machining a sacrificial part program and work piece in addition to machining the user's part program and work piece, according to one embodiment of the present invention.

FIG. 3 illustrates a method 300 for measuring tangential tool forces and process model parameters in real-time according to one embodiment of the present invention. The process is similar to the process described in FIG. 3 of [Esterling, 2005]. FIG. 4 illustrates a revision of method 300 to include the case where a sacrificial work piece and part program are used to measure tangential tool forces and process model parameters in real-time. FIG. 5 illustrates a revision of method 300 to include the case where a sacrificial work piece and part program are used to measure non-tangential tool forces and process model parameters in real-time.

The process 300 in FIG. 3 begins by determining a force profile for a standard tool, work piece, and part program at the central facility using a force sensor that directly measures tool forces (step 302). More specifically, a set of relatively simple cuts defined by the standard part program are made in the standard work piece using the standard tool. While the standard part program may be relatively simple, the cutting process is sufficiently robust to provide the tool force data necessary to compute process model parameters, specifically, the cutting energies for the standard tool and work piece. Conventional tests directly measure the tool forces using a force sensor to generate the force profile, and a best fit process is used to determine the process model parameters or cutting energies that relate the geometric model of the cutting process to tool forces.

The standard tool, work piece, and part program are provided to a user facility from the central facility (step 304). In addition, a computer readable media is provided to the user facility, as discussed above, wherein the computer readable media stores the tool force measurement and calibration system 46. The standard part program along with the force profile determined at the central facility for the standard tool, work piece, and part program may be incorporated into the tool force measurement and calibration system 46 software stored on the computer readable media. As such, the force profile and the standard part program may be invisible to the end user.

Next, the spindle motor power of a CNC machine at the user facility is measured for the standard tool, work piece, and part program (step 306). It should be noted that the standard tool, work piece, and part program are the same as used to determine the force profile at the central facility in step 302. A transfer function relating the measured spindle motor power to the force profile determined at the central facility is then determined at the user facility (step 308).

More specifically, the user replicates the same cuts on the CNC machine at the user facility with the standard tool, work piece, and part program. Since the tool and work piece are the same as used in the central facility in step 302, the cutting energies are also the same. This means the tool force profile over the part program remains the same. Since the force profile is known, the spindle motor power are measured over the standard part program, and a match or transfer function is determined that relates the spindle motor power of the CNC machine at the user facility to tangential tool forces. In the simplest case, this is just a proportionality factor between the spindle power and the tangential force component. In practice, some variation in these factors is expected with motor load, spindle speed and condition of the motors, which is handled by repeated calibration tests by the end user to determine the dependence of the transfer function on these conditions.

In principle, only one set of standard tool cuts is needed to determine the transfer function between spindle motor power and the tangential tool force. However, this transfer function may change with the motor characteristics and so should be repeated for a cool (startup) and warm motor and then repeated over time to account for changes (wear) in motor or belt condition and the like. These latter repetitions are at infrequent intervals (e.g. quarterly).

Next, tangential tool forces for a desired tool, work piece, and part program are determined in real-time based on measuring the spindle motor power and converting motor power to tangential tool forces using the transfer function relating spindle motor power to tangential tool forces (step 310). However, applications such as NC optimization and integrated tool condition monitoring (TCM) programs require the process model parameters or, in this case, cutting energies, so they may look ahead for optimization or compare predicted tool forces or motor power to actual tool forces or motor power for TCM. The predicted tangential tool forces or spindle motor power may be determined based on the process parameters determined initially for a sharp tool. Thus, it may be desirable to determine the process model parameters or cutting energies for each tool and work piece as in the next step.

Using the tool forces, a geometric model for the cutting process, and the process model, the cutting energies (process model parameters) are then determined (step 312). The user's tool and work piece have process model parameters (cutting energies) that differ from the values for the standard tool and work piece determined in step 302. The measured tool forces from step 310 can be combined with the geometric model of the CNC cutting process to obtain the process model parameters specific for the particular tool and work piece.

The geometric model of the CNC cutting process provides the geometric information used by the process model. The variations in the geometric information for the desired part program are obtained using the geometric model. Frequently, but not always, the variations in the geometry of the first few tool cuts will result in a sufficiently rich set of data that will allow the calibration program to perform a best fit of the process model parameters, thereby calibrating the process model.

If these initial tool cuts in the user's desired part program are not sufficiently diverse to provide a good data fit in determining the process model parameters, the tool force measurement and calibration system 46 (FIGS. 2A and 2B) will make a minor modification to the user's part program. As described below, in the preferred embodiment, the process model predicts tool forces based on the material removal rate and the contact area for each tool cut. If the geometry of the initial cuts is such that there is insufficient variation in the material removal rate and/or contact area, then the calibration process will not have sufficient data to carry out a proper best fit. In that case, the tool force measurement and calibration system 46 (FIGS. 2A and 2B) will adjust the feed rate (the speed with which the tool cuts into the work piece) to a lower than normal value (e.g. to 25% of the programmed feed). Over a relatively short period of time, typically seconds, the feed rate is ramped back to the normal value. This variation in feed rate guarantees that the otherwise relatively constant material removal rate varies accordingly. This provides the tool force measurement and calibration system 46 (FIGS. 2A and 2B) with a sufficiently rich set of data to carry out the best fit to the process model parameters or cutting energies.

The variation in the feed rates in the user's part program is not always feasible or desirable. The methods 400 and 500, described in FIGS. 4-5, provide alternative methods for obtaining tool forces and process model parameters without modifying the user's part program or the programmed feed rates.

Using steps 310 and 312, tool forces and process model parameters for any tool, work piece, and part program can be determined by the user at the user facility in real-time without the use of a force sensor, such as the force sensor 12 (FIG. 1).

The process model parameters may periodically be updated due to tool wear (step 318). The cutting energies will increase over time as a particular tool wears. This simply reflects the well-known result that tool forces increase as the tool wears. The variation in cutting energies is an important measure of tool wear and is the basis for a process-independent tool condition monitoring. The variation in cutting energies also affects the NC optimization strategy. For example, if the optimization condition of interest is maintaining the spindle power or torque below some maximum allowed value, the NC optimization program requires the updated values of the cutting energies to properly predict what that power or torque will be for the worn tool. Absent this update, the predicted power or torque can be two to three times lower than the actual value, making the NC optimization program relatively useless.

The change in the cutting energies as the tool wears may be determined by repeating steps 306-312 at suitable time intervals in the CNC part program.

It should be noted that the only new requirements of the present invention on the end user are to (1) install a non-invasive power sensor, if a suitable open architecture control is not in place, and (2) perform some simple cutting tests with standard tooling and part material. These tests only need to be performed under conditions where the transfer function of motor power tool forces is expected to change. This would include an initial set of tests taken over a series of motor loads and rpm. The variation in motor loads would be effected by varying the axial depth of cut and/or feed rate. The variation in motor rpm would be effected by varying the spindle speed and/or the feed rate of the feed drive motors. These variable conditions will all be codified in the standard part program provided to the end user in step 304, so from the user's point of view, they merely need to run one simple part program for the initial calibration.

The transfer function of spindle motor power to tangential tool forces may be expected to vary from a cool motor (start up) to a warm motor condition. Thus, as described above with respect to steps 306-308, the initial calibration tests may be run multiple times as the CNC machine warms up to account for this modest, but important, trend in the transfer function.

The transfer function of spindle motor power to tangential tool forces may be expected to vary as the CNC changes with usage. For example, spindle motor and coupling degradation may occur due to usage. Thus, as described above with respect to step 318, calibration tests should be repeated periodically as a maintenance issue, on the order of a few times per year.

In sum, while the user needs to perform some calibration tests, those tests will be simple for the user to perform, and may be performed when the system is initially installed and at well-spaced maintenance intervals.

It should be noted that spindle motor power can be consumed internal to the motor of the CNC machine 16 (FIG. 1) or 48 (FIGS. 2A and 2B) due to friction and other effects, or can be consumed externally in the cutting process. These effects need to be incorporated into the calibration process. Even when there is no cutting, the spindle motor of the CNC machine 16 or 48 requires power to continue rotating. The zero load power is referred to as "tare power." This tare power needs to be subtracted from the measured power to distinguish that portion of total power involved in the cutting process.

The tare power can change substantially as the motor warms up from the start-up state. The tare power may also vary with machine rpm and machine condition. The application of this tool force measurement system will require periodic measurements of the zero load power to maintain an accurate compensation for tare power. The tare power may be determined at the start of the part program and at each tool change before the tool cuts the work piece and while the tool may safely be considered in a non-cutting condition. This latter condition may be determined using a geometric model of the cutting process, such that periodic updates of the tare power may be provided during the cutting process. Except where otherwise indicated, all references to spindle power contained herein refer to incremental spindle power over tare spindle power.

The process model relates the cutting geometry to the tool forces via the cutting energies (process model parameters). The process model assumes that the spindle motor power is linearly related to the material removal rate (the rate at which the tool removes volume as it cuts) and the contact area rate (the rate at which the tool area is in contact with the part) as:

$$Ps = Ktc*MRR + Kte*CA \qquad [1]$$

where Ps is the spindle power, MRR is the material removal rate, CA is the contact area rate, Ktc is the tangential cutting energy associated with the material removal rate and Kte is the tangential cutting energy associated with the contact area rate.

For a constant radius tool, the tangential tool force is obtained from equation [1] as:

$$Ft = (Ktc*MRR + Kte*CA)/V \qquad [2]$$

where Ft is the tangential tool force (the component tangential to the cutting surface of the tool) and V is the tooth speed. V is related to the spindle speed as (again for a constant radius tool):

$$V = 2*pi*R*S \qquad [3]$$

where R is the tool radius and S is the spindle speed.

If the tool does not have a constant radius, then the tool may be split into slices along the tool axis and similar relationships derived.

In these relationships, Ps is an ideal spindle power. In practice, there is always some residual spindle power required even when the tool is not cutting. This residual power comes from overcoming friction in the system and is referred to as the "tare" power. In addition, the remaining power is not delivered with 100% efficiency to the cutting process. As a result, the spindle power Ps may be expressed as:

$$Ps = e\_spindle * (P\_spindle - Ps\_tare) \quad [4]$$

where Ps_tare is the spindle tare (non-cutting) power, P_spindle is the measured total spindle power and e_spindle is an efficiency factor that relates the measured or delivered power to the effective power. Both the tare power and the efficiency factor depend on the individual CNC (spindle and motor type, condition of the motor, drives) as well as potentially the spindle load and speed.

Similar relationships are available for radial and axial forces. Radial forces are forces perpendicular to the tooth as the tooth cuts the material. Axial forces are forces parallel to the tool axis as the tool cuts the material. The total force on a tool is a vector sum of the tangential, radial and axial forces on each tooth.

The cutting energies for the radial forces may be related to the material removal rate MRR and the contact area rate CA through similar radial cutting energies Krc and Kre respectively. Similarly, the cutting energies for the axial forces may be related to the material removal rate MRR and the contact area rate CA through axial cutting energies Kac and Kae respectively.

In sum, the process model has six parameters or cutting energies that describe the details of the cutting process: Ktc, Kte, Krc, Kre, Kac and Kae.

The process model provides a basis for relating spindle motor power to tangential tool forces and to the derivation of the cutting energies. Below, two important application areas are described: NC optimization and tool condition monitoring.

NC Optimization is the optimization of the part program by modifying the programmed path and/or technological parameters in order to achieve such goals as higher production rates, better surface quality, less wear and tear on the CNC equipment, enhanced tool life, or some combination of the preceding. Most frequently, the tool path is not modified such that the as-made part remains constant, but the technological parameters such as spindle speed or feed drive velocity are modified to achieve the desired objectives.

NC optimization requires an ability to "look ahead" and adjust CNC process variables, such as feeds and speeds, to maximize productivity and part quality over the entire cutting process. The look ahead requires a prediction of the tool forces over the part program. The optimization strategy is to modify the part program, such as the feeds and speeds, to adjust tool forces and achieve the optimization objective(s). The optimizing feeds and speeds can be selected so as to limit tool stress, tooth stress, tool vibration, tool/surface deflection, and torque/power.

For example, if the objective is to increase productivity, the feeds may be increased over the programmed values while maintaining tool forces within a range providing acceptable surface quality (tool deflection) and also maintaining spindle power and torque values below acceptable maximum values. Another objective can be increased spindle life or tool life which may be achieved by adjusting the feeds and speeds so that the excursions (maxima and minima) in the tool forces are alleviated, reducing fatigue and other effects on the spindle and/or tool.

The prediction of the tool forces, both for the original and optimized part program, requires geometric and cutting process information, such as how the tool is and will be engaged with the work piece, coolant conditions, etc., and a reliable process model. Together, the geometric model and the process model predict the current and expected tool forces. There are a variety of techniques available for the geometric model or virtual CNC. This technology, which is well developed, is referred to as NC verification. A variety of process models are available in the research literature.

The process model, process model parameters, and geometric model (virtual CNC) may then be used with a conventional optimization strategy to determine the tool forces both for current as well as for future tool cuts with the same tool. This anticipated tool force information can then be used to optimize the cutting process.

Since the measurements are being made in situ, the changes in the tool condition, such as wear state, are tracked, and this updated information will be used to modify the optimization strategy from that suitable for an ideal (sharp) tool.

Tool Condition Monitoring (TCM) is used to monitor the condition of a tool in use in a CNC machine. The conditions being monitored may include tool wear, tool or tooth breakage, tool runout (tool offset from centerline of the spindle), and/or excessive tool vibrations due to, for example, chatter.

According to the present invention, the process model parameters determined by the method of FIGS. 3-5 may be used along with the process model and a geometric model for any desired cutting process to perform TCM. More particularly, the process model, process model parameters (cutting energies), and geometric model may be used to predict the tool forces during a cutting process. The actual tool forces may be determined in real-time by converting measured motor power to tool forces using the transfer function relating motor power to tool forces, as described with respect to FIGS. 1-2. Then, the actual tool forces may be compared to the predicted tool forces. Deviations of the actual tool forces from the predicted tool forces indicate conditions such as tool wear or, in more catastrophic cases, tool breakage.

Absolute force values are not necessarily required for tool condition monitoring. For example, the time variation of the cutting energies as the tool wears can be a sensitive indicator of tool wear and impending severe tool wear damage. This time variation can be expressed as a ratio of the current cutting energies to the initial (sharp tool) cutting energies. By taking a ratio, the motor efficiency (if it is assumed constant) is factored out of Equation [4]. As a result, the calibration process is greatly simplified, eliminating the need for standard tooling and part materials.

The Method 400 described in FIG. 4 is substantially the same as the method 300 described in FIG. 3 through step 412 in FIG. 4. The principal difference is that a sacrificial work piece and part program is used in place of the desired work piece and part program. This provides flexibility in the tool cutting process to ensure that the cutting process has sufficient variation in the cutting conditions (in the material removal rate and contact area rate) to ensure, in turn, the accurate determination of the tangential cutting energies Ktc and Kte. Since the process is substantially the same through step 412, for conciseness the details provided with FIG. 3 will not be repeated for FIG. 4.

The tangential cutting energies obtained through method 400 are for the desired tool cutting the sacrificial work piece. The desired tangential cutting energies are for the desired tool cutting the desired work piece. Steps 414-416 in method 400 provide the necessary conversion between these cutting energies. In step 414, the tangential forces for the desired tool, work piece and part program are measured using the transfer function relating the spindle motor power to the tangential force. These tangential forces may be averaged over a suitable portion of the desired part program so as to minimize the effects of noise. In step 416, the averaged tangential force is computed with the process model using the process model parameters obtained in step 412. Since these latter process model parameters are for the sacrificial work piece and are not for the desired work piece, there will be a scale factor relating the predicted average tangential tool force to the measured average tangential tool force. This scale factor is applied to the process model parameters obtained with the desired tool and the sacrificial work piece to obtain the process model parameters obtained with the desired tool and the desired work piece.

Step 418 in Method 400 is similar to step 318 in Method 300, updating the process model parameters with tool and/or CNC wear so for conciseness the detailed description will not be repeated.

Method 500 in FIG. 5 is substantially the same as Method 400 in FIG. 4. The difference is that data from spindle motor power is replaced by sensor data from a source such as a microphone, accelerometer or load cell sited on the sacrificial work piece. This latter sensor data is responsive to and related to non-tangential tool forces in addition to tangential tool forces. The specific relationship will depend on the sensor used. For example, a 1D load cell would be dependent on the tool forces in a particular direction. A microphone would be dependent on the tangential and non-tangential tool forces responsible for creating an audio signal as the tool cuts the part. These relationships would be determined at the central facility using a range of tool cuts on the sacrificial material, correlating the sensor output with the 3D force vector measured with the central facility force sensor.

Method 500 in FIG. 5 will obtain information on the non-tangential component of the tool forces similar to Method 400 in FIG. 4 obtains the tangential tool forces. These non-tangential tool forces may be used to obtain the non-tangential (radial and/or axial) process model parameters, again in a method that parallels the method in FIG. 4. The non-tangential process model parameters may be updated due to tool and/or CNC wear again similar to Method 400 in FIG. 4 and, for conciseness, the details will not be repeated.

The present invention provides substantial opportunity for variation without departing from the spirit or scope of the present invention. For example, although the above description focuses on sensing spindle motor power or other sensors such as microphones, accelerometers and load cells and determining a transfer function for converting the sensor data to tool forces, the present invention should not be limited thereto. Various other motor characteristics of the CNC machine 48 may be sensed and thereafter converted to tool forces. For example, in addition to spindle motor power, motor characteristics that may be sensed include, but are not limited to, spindle motor torque or current, feed drive motor power, current or torque as well as audio, acoustic, ultrasonic, and vibration signals, where a transfer function may be determined to convert the measured sensor data characteristics to tool forces in a manner similar to that described above for converting spindle motor power to tool forces.

Those skilled in the art will recognize improvements and modifications to the preferred embodiments of the present invention. All such improvements and modifications are considered within the scope of the concepts disclosed herein and the claims that follow.

What is claimed is:

1. A method for measuring tool forces comprising:
    determining a force profile for a standard tool, work piece, and part program on a first Computer Numerical Control (CNC) machine based on direct measurement of tool forces;
    providing the standard tool, work piece, and part program to a user facility;
    measuring a sensor characteristic of a second CNC machine at the user facility for the standard tool, work piece, and part program;
    determining a relationship between the sensor characteristic and tool forces based on the sensor characteristic for the standard tool, work piece, and part program and a force profile determined for the standard tool, work piece, and part program on the first CNC machine; and
    determining tool forces for a work piece, part program and desired tool on the second CNC machine at the user facility based on the sensor characteristic for the work piece, part program and desired tool and the relationship between the sensor characteristic and tool forces.

2. The method of claim 1 wherein the work piece, and part program on the second CNC machine at the user facility may be the desired work piece and desired part program or a sacrificial work piece and sacrificial part program.

3. The method of claim 1 wherein the sensor characteristic comprises one or more of the following sensor characteristics: spindle motor power, feed drive power, feed drive current, microphone, accelerometer and load cell data.

4. The method of claim 3 wherein spindle motor power is related to tangential tool forces and feed drive power, feed drive current, microphone, accelerometer and load cell data are related to tangential and non-tangential tool forces.

5. The method of claim 1 wherein determining the tool forces for the work piece, part program and desired tool comprises:
    measuring the sensor characteristic for the work piece, part program and desired tool; and
    converting the sensor characteristic for the work piece, part program and desired tool to the tool forces for the work piece, part program and desired tool using the relationship between the sensor characteristic and tool forces.

6. The method of claim 1 wherein determining the force profile for the standard tool, work piece, and part program on the first CNC machine based on direct measurement of tool forces comprises determining the force profile for the standard tool, work piece, and part program on the first CNC machine based on direct measurement of tool forces in a central facility at a first geographic location, wherein the user facility is at a second geographic location.

7. The method of claim 1 further comprising repeating the steps of measuring the sensor characteristic of the second CNC machine at the user facility for the standard tool, work piece, and part program and determining the relationship between the sensor characteristic and tool forces for cool and warm sensor conditions of the second CNC machine.

8. The method of claim 1 further comprising periodically repeating the steps of measuring the sensor characteristic of the second CNC machine at the user facility for the standard tool, work piece, and part program and determining the relationship between the sensor characteristic and tool forces such that the relationship between the sensor characteristic and tool forces is periodically updated to account for wear of the second CNC machine.

9. The method of claim 1 further comprising determining process model parameters based on a process model and a geometric model and the tool forces for the work piece, part program and desired tool.

10. The method of claim 9 wherein the process model parameters comprise cutting energies.

11. The method of claim 9 further comprising predicting tool forces for the work piece and desired tool based on the process model and the process model parameters.

12. The method of claim 9 further comprising predicting tangential and non-tangential tool forces for the desired work piece and the desired tool based on the process model and the process model parameters for the desired work piece and the desired tool by:
   obtaining the process model parameters for the desired tool and a sacrificial work piece with a sacrificial part program that has a robust variation in the desired tool cutting conditions, not limited as the desired part program;
   predicting a first averaged tangential tool forces for the desired tool and desired work piece using the process model parameters obtained for the sacrificial work piece;
   measuring a second averaged tangential tool forces for the desired tool and desired work piece where the sensor is the spindle motor power;
   obtaining the ratio of the second averaged tangential tool force to the first averaged tangential tool force; and
   multiplying the process model parameters for the desired tool and a sacrificial work piece by this ratio to predict the process model parameters for the desired tool and desired work piece.

13. The method of claim 12 further comprising predicting tangential and non-tangential tool forces for the desired work piece and desired tool based on the predicted process model parameters for the desired work piece and desired tool.

14. The method of claim 11 further comprising performing Numerical Control (NC) optimization based on the predicted tool forces.

15. The method of claim 11 further comprising performing tool condition monitoring for the desired tool based on the predicted tool forces.

16. The method of claim 15 wherein performing tool condition monitoring for the desired tool comprises:
   measuring the sensor characteristic for subsequent cutting processes on the second CNC machine for the work piece and desired tool;
   converting the sensor characteristic for the subsequent cutting processes to tool forces based on the relationship between the sensor characteristic and tool forces; and
   monitoring the condition of the desired tool based on a comparison of the tool forces for the subsequent cutting processes and the predicted tool forces.

17. The method of claim 9 further comprising performing tool condition monitoring for the desired tool based on the process model parameters.

18. The method of claim 16 wherein performing tool condition monitoring comprises:
   determining second process model parameters for subsequent cutting processes on the second CNC machine for the work piece and desired tool; and
   monitoring the condition of the desired tool based on a comparison of the process model parameters for the work piece, part program and desired tool and the second process model parameters for the subsequent cutting processes.

19. The method of claim 1 wherein determining the relationship between the sensor characteristic and tool forces comprises determining a transfer function for converting the sensor characteristic to tool forces.

20. A method for measuring tool forces comprising:
   receiving a standard tool, work piece, and part program from a central facility at a user facility;
   measuring a sensor characteristic of a first Computer Numerical Control (CNC) machine at the user facility for the standard tool, work piece, and part program;
   determining a relationship between the sensor characteristic and tool forces based on the sensor characteristic for the standard tool, work piece, and part program and a force profile determined on a second Computer Numerical Control (CNC) machine at a central facility for the standard tool, work piece, and part program; and
   determining tool forces for a work piece, part program and desired tool on the first CNC machine at the user facility based on the sensor characteristic for the work piece, part program and desired tool and the relationship between the sensor characteristic and tool forces.

21. The method of claim 20 wherein determining the tool forces for the work piece, and part program and desired tool comprises:
   measuring the sensor characteristic for the work piece, part program and desired tool; and
   converting the sensor characteristic for the work piece, part program and desired tool to the tool forces for the work piece, part program and desired tool using the relationship between the sensor characteristic and tool forces.

22. The method of claim 20 wherein receiving the standard tool, work piece, and part program further comprises receiving the standard tool, work piece, and part program from the central facility at a first geographic location, wherein the user facility is at a second geographic location.

23. A computer readable media encoded with software for instructing a computer to:
   measure a sensor characteristic of a first CNC machine at a user facility for a standard tool, work piece, and part program, the standard tool and work piece provided from a central facility;
   determine a relationship between the sensor characteristic and tool forces based on the sensor characteristic for the standard tool, work piece, and part program and a force profile determined on a second CNC machine at the central facility for the standard tool, work piece, and part program; and
   determine tool forces for a work piece, part program and desired tool on the first CNC machine at the user facility based on the sensor characteristic for the work piece, part program and desired tool and the relationship between the sensor characteristic and tool forces.

24. The computer readable media of claim 23 wherein to determine tool forces for the work piece, part program and desired tool, the computer readable media further instructs the computer to:
   obtain measurements of the sensor characteristic for the work piece, part program and desired tool; and
   convert the sensor characteristic for the work piece, part program and desired tool to the tool forces for the work piece, part program and desired tool using the relationship between the sensor characteristic and tool forces.

* * * * *